(12) United States Patent
Davis et al.

(10) Patent No.: US 8,685,364 B2
(45) Date of Patent: Apr. 1, 2014

(54) LIQUID COMPOSITION HAVING AMMONIA BORANE AND DECOMPOSING TO FORM HYDROGEN AND LIQUID REACTION PRODUCT

(71) Applicant: Los Alamos National Security, LLC, Los Alamos, NM (US)

(72) Inventors: Benjamin L. Davis, Los Alamos, NM (US); Brian D. Rekken, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/850,959

(22) Filed: Mar. 26, 2013

(65) Prior Publication Data

US 2013/0251625 A1    Sep. 26, 2013

Related U.S. Application Data

(60) Provisional application No. 61/615,650, filed on Mar. 26, 2012.

(51) Int. Cl.
*H01M 8/04* (2006.01)
*C01B 3/02* (2006.01)

(52) U.S. Cl.
USPC ................... 423/648.1; 252/188.25

(58) Field of Classification Search
None
See application file for complete search history.

(56) References Cited

PUBLICATIONS

Ammonia Borane Hydrogen Release in Ionic Liquids Inorganic Chemistry, vol. 48, 2009, p. 9883-9889 Daniel W. Himmelberger et al.*
EIC Search—Sep. 11, 2013.*
Bluhm et al., "Amineborane-Based Chemical Hydrogen Storage: Enhanced Ammonia Borane Dehydrogenation in Ionic Liquids," J. Am. Chem. Soc., 2006, vol. 128, No. 24, pp. 7748-7749 (published on the web on May 28, 2006).
Dietrich et al., "Iridium-Catalyzed Dehydrogenation of Substituted Amine Boranes: Kinetics, Thermodynamics, and Implications for Hydrogen Storage," Inorg. Chem., 2008, vol. 47, pp. 8583-8585 (published on web Sep. 12, 2008).
Ewing et al., "Syntheses and Structural Characterizations of Anionic Borane-Capped Ammonia Borane Oligomers: Evidence for Ammonia Borane H2 Release via a Base-Promoted Anionic Dehydropolymerization Mechanism," J. Amer. Chem. Soc., 2011, vol. 133, pp. 17093-17099 (published Sep. 30, 2011).
Framery et al., "Efficient Synthesis and NMR Data of N- or B-Substituted Borazines," Heteroatom Chemistry, 2000, vol. 11, pp. 218-225.
Grant et al., "Thermochemistry for the Dehydrogenation of Methyl-Substituted Ammonia Borane Compounds," J. Phys. Chem. A, 2009, vol. 113, pp. 6121-6132 (published on web Mar. 7, 2009).
Hamilton et al, "B-N compounds for chemical hydrogen storage," Chem. Soc. Rev., 2009, vol. 38, pp. 279-293 (published Nov. 26, 2008).
Himmelberger et al., "Ammonia Borane Hydrogen Release in Ionic Liquids," Inorg. Chem., 2009, vol. 48, pp. 9883-9889 (published on web Sep. 21, 2009).
Mal et al., "Transition metal catalyzed dehydrogenation of amine-borane fuel blends," Chem Comm, 2011, 47, 2922-2924 (published online Jan. 24, 2011).
Staubitz et al., "Ammonia-Borane and Related Compounds as Dihydrogen Sources," Chem. Rev., 2010, vol. 110, pp. 4079-4124 (published on web Jul. 14, 2010).
Staubitz et al., "Iridium-Catalyzed Dehydrocoupling of Primary Amine-Borane Adducts: A Route to High Molecular Weight Polyaminoboranes, Boron-Nitrogen Analogues of Polyolefins," Angew. Chem., 2008, vol. 47, pp. 6212-6215 (published online Jul. 9, 2008).

* cited by examiner

*Primary Examiner* — Melvin C Mayes
*Assistant Examiner* — Douglas Call
(74) *Attorney, Agent, or Firm* — Samuel L. Borkowsky

(57) ABSTRACT

Liquid compositions of ammonia borane and a suitably chosen amine borane material were prepared and subjected to conditions suitable for their thermal decomposition in a closed system that resulted in hydrogen and a liquid reaction product.

10 Claims, No Drawings

LIQUID COMPOSITION HAVING AMMONIA BORANE AND DECOMPOSING TO FORM HYDROGEN AND LIQUID REACTION PRODUCT

PRIORITY CLAIM

This application claims the benefit of U.S. Provisional Application 61/615,650, filed Mar. 26, 2012, incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally materials that store and release hydrogen and more particularly to liquid compositions that include ammonia borane and undergo thermal decomposition to form hydrogen and a liquid reaction product.

BACKGROUND OF THE INVENTION

There is interest in materials that can store and release hydrogen [1]. In particular, there is interest in developing liquid materials that can produce fuel-cell grade hydrogen (H2) for automotive applications. Liquid materials that release hydrogen are expected to be more readily adaptable than solids to our current liquid-based fuel infrastructure.

A material of particular interest for hydrogen storage is ammonia borane because ammonia borane has a high hydrogen storage capacity of about 19 weight percent $H_2$ and reasonable hydrogen release kinetics [2]. Ammonia borane, however, is a solid at room temperature. Therefore, researchers have tried to prepare liquid compositions that contain ammonia borane and undergo thermal decomposition to form hydrogen ($H_2$) and a liquid reaction product. For example, there have been attempts at preparing such liquid materials by combining ammonia borane with ionic liquids [3]. Such mixtures are indeed liquids. However, as hydrogen is released from these liquid materials, a phase change from liquid to solid has always been the result.

Liquid compositions that include ammonia borane and undergo thermal decomposition to form $H_2$ and a liquid reaction product are desirable compositions.

SUMMARY OF THE INVENTION

The present invention provides a liquid composition comprising ammonia borane and a suitably chosen amine-borane-containing material such that said liquid composition undergoes thermal decomposition to form hydrogen ($H_2$) and a liquid reaction product. Examples of suitably chosen amine-borane materials include n-hexylamine-borane, methoxypropylamine-borane, and an amine borane that is also an ionic liquid going by the formula [EtImPrNH$_2$BH$_3$][NTf$_2$]. It is expected that other suitably chosen amine borane materials include n-propylamine-borane, n-pentylamine-borane, n-heptylamine-borane, other alkoxyalkylamine-boranes, and other ionic liquids that are amine-boranes.

Another aspect of the invention relates to the reaction product that results from the thermal decomposition of the liquid composition.

DETAILED DESCRIPTION

An aspect of the invention relates to compositions that (1) are liquids; (2) include ammonia borane, and (3) undergo dehydrogenation to produce $H_2$ and a liquid reaction product.

An embodiment composition includes both ammonia borane and hexylamine-borane. In an embodiment, this composition of ammonia borane and hexylamine-borane is a neat composition, which means that the composition does not include a separate solvent.

Hexylamine-borane was synthesized by reacting n-hexyl amine with borane-dimethyl sulphide, as summarized in Scheme 1 below.

Scheme 1

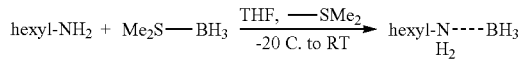

In a typical preparation of hexylamine-borane, a solution of n-hexylamine in tetrahydrofuran ("THF") was chilled to –20° C. and then mixed slowly with a 2.0 M solution of Me$_2$S—BH$_3$ in THF (solutions of the ingredients in other solvents, such as toluene, may also be used). After warming the reaction mixture to room temperature, the volatiles were removed, resulting in the production of hexylamine-borane as a colorless oil in 99% yield. The oil was characterized by NMR spectroscopy. The $^1$H NMR spectrum of hexylamine-borane in C$_6$D$_6$ solvent included the following peaks: a broad singlet at δ=3.16 parts per million ("ppm") integrating for 2H (i.e. two hydrogen atoms) and assigned to the two hydrogen atoms of the NH$_2$ group, a pentet at δ=2.38 ppm integrating for 2H and assigned to the methylene ("CH$_2$") directly attached to the NH$_2$, a multiplet integrating for 11.4H at δ from 1.12-0.82 ppm. The $^1$H B NMR spectrum in C$_6$D$_6$ solvent included a quartet centered at 17.7 ppm. The boron-hydrogen coupling constant J[BH] was 92 Hz.

Hexylamine-borane was found to be stable at room temperature, as evidenced by a lack of significant changes to its $^{11}$B NMR spectrum over a two week period. The thermal behavior of hexylamine-borane was investigated by heating hexylamine-borane in closed system to a temperature of 130° C. for 12 hours. The products were hydrogen and a colorless oil (in contrast to this thermal behavior observed for hexylamine-borane, ammonia borane decomposes under these conditions to form a solid product). The identity of the colorless oil produced upon dehydrogenation of hexylamine-borane was determined using NMR spectroscopy. The $^1$H and $^{11}$B NMR spectra of the colorless oil indicate the presence of a B—H moiety that integrates for 3H. The $^{11}$B NMR spectrum of the oil includes a broad peak at δ=34 ppm that does not resolve upon heating. These data are consistent with a product assignment of N-trihexylborazine. Scheme 2 below summarizes the thermal decomposition of hexylamine-borane to N-trihexylborazine [4].

Scheme 2

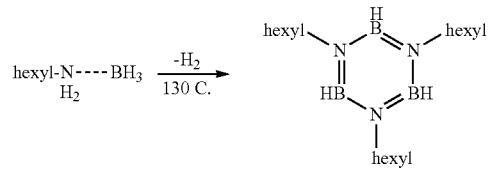

Ammonia borane and hexylamine-borane follow similar dehydrogenation pathways, based on theoretical treatments [5]. A catalyzed copolymerization of methylamine-borane with ammonia borane in organic solvents has been reported [6].

Several embodiment compositions including both ammonia borane and hexylamine-borane were prepared. A 2:1 composition of AB and hexylamine-borane was prepared. A 1:1 composition of AB and hexylamine-borane was also prepared. A 1:2 composition of AB and hexylamine-borane was also prepared. Each of these compositions was heated for about 12 hours to a temperature of about 130° C. A liquid product was observed with the 1:1 and the 1:2 compositions.

The 1:1 composition of AB and hexylamine-borane stores about 6 weight percent hydrogen. To our knowledge, these compositions of AB and hexylamine-borane are the first examples compositions of AB that are liquid compositions that thermally decompose to form H2 and a liquid reaction product.

In another embodiment, a composition of AB and methoxypropylamine-borane was prepared and subjected to conditions of thermal decomposition. Scheme 3 below summarizes the synthesis of methoxypropylamine-borane.

Scheme 3

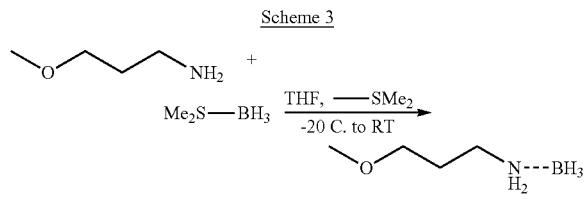

Methoxypropylamine-borane was synthesized as follows: to a −20° C. solution of methoxypropylamine in THF (3.57 grams, 40 millimoles) was added borane-dimethylsulfide (20.0 milliliters, 2.0 Molar, 40 millimoles), also chilled to −20° C. The resulting colorless solution was stirred and allowed to warm to room temperature. After the volatiles were removed, 4.04 grams (39.2 millimoles, 98% yield) of a colorless oil was obtained. A small amount of the colorless oil was dissolved in $C_6D_6$ solvent and characterized by NMR spectroscopy. The $^1H$ NMR spectrum included the following peaks: δ=3.51 ppm (broad singlet integrating for 2.15H, assigned to $NH_2$), δ=2.78 ppm (multiplet integrating for 5H), δ=2.53 ppm (multiplet integrating for 2H), δ=2.23 ppm (broad singlet integrating for 2.8H assigned to $BH_3$), δ=1.13 ppm (multiplet integrating for 2H). The $^{11}B$ NMR spectrum included a quartet at δ=17.8 ppm with a B—H coupling constant J[BH] of 92 Hertz. There was little or no decomposition of the colorless oil after almost three months at room temperature. The stability of this material may be due to hydrogen bonding between methoxypropylamine and N—H groups of the amine borane.

In another embodiment of a composition that includes AB and thermally decomposes to form H2 and a liquid reaction product, a composition of AB and a suitably chosen ionic liquid was prepared. The ionic liquid was an amine-borane containing ionic liquid. The ionic liquid is identified herein by the formula [EtImPrNH$_2$BH$_3$][NTf$_2$]. The synthesis of [EtImPrNH$_2$BH$_3$][NTf$_2$] is summarized in Scheme 4 below.

Scheme 4

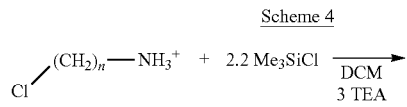

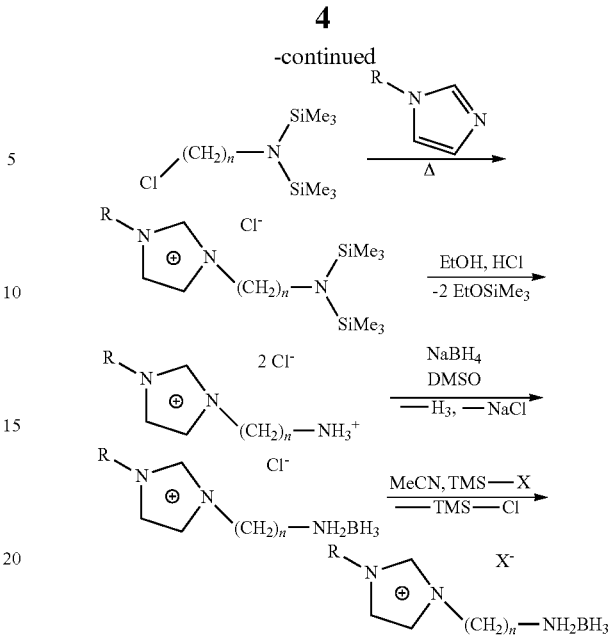

In Scheme 4, "n" is equal to three, R is ethyl, and X is bis(trifluoromethanesulfonimide). The multistep synthesis of [EtImPrNH$_2$BH$_3$][NTf$_2$] now follows.

In a first step a 500 mL flask was charged with 13.002 g (100 mmol) of [ClCH$_2$CH$_2$CH$_2$NH$_3$]Cl that was dissolved in 300 mL of CH$_2$Cl$_2$ and 46.4 mL (300 mmol) of triethylamine. After ca. 10 min, a precipitate began to evolve. The flask was cooled to 0° C. and a solution containing 28.2 mL (222.2 mmol) of TMSCl and 50 mL of CH$_2$Cl$_2$ was added slowly over 2 h. The solution was stirred for an additional 2 h and then allowed to return to ambient temperature where it was stirred for 3 days. The supernatant liquid was decanted and then all volatile components were remove in vacuo to produce both a solid residue and a liquid. The liquid was extracted using ca. 200 mL of hexanes and subsequently the volatile components were removed under reduced pressure to yield 18.3898 g (77.30 mmol, 77.3%) of ClCH$_2$CH$_2$CH$_2$N(SiMe$_3$)$_2$ as a colorless liquid. The product had the following NMR features: $^1H$ NMR (300 MHz, CD$_3$CN) δ=0.11 (s, —Si(CH$_3$)$_3$, 18H), 1.83 (m, CH$_2$N, 2H, $J_{HH}$=5.29 Hz), 3.52 (t, ClCH$_2$, 2H, $J_{HH}$=6.3 Hz); $^{13}C\{^1H\}$ NMR (75 MHz, CD$_3$CN) 2.30, 38.50, 43.74, 43.93.

In a second step, a 100 mL flask was charged with 16.900 g (71.04 mmol) of ClCH$_2$CH$_2$CH$_2$N(SiMe$_3$)$_2$ and 7.170 g (74.59 mmol) of ethylimidazole which were miscible. The flasked was heated to ca. 120° C. with vigorous stirring. After ca. 1 h of stirring, a new layer appeared in the flask that progressively increased over 6 h at which it became a singular phase again. Additionally, after 1 h of stirring, colorless crystals sublimed near the top of the flask. The flask was then allowed to cool for 20 min after which ca. 50 mL of diethyl ether was added and stirred with the liquid until it formed a white solid. The flask was allowed to cool to ambient temperature and the ether was filtered. The white solid was washed with 25 mL of diethyl ether (×3) and then dried under vacuum to yield 19.322 g (58.02 mmol, 81.43%) of intermediate 4(a). Intermediate 4(a) had the following NMR features: $^1H$ NMR (300 MHz, d$_3$-MeCN) δ=0.08 (s, 18H, Si(CH$_3$)$_3$), 1.49 (t, 3H, J=7.0 Hz), 1.90 (multi, 2H), 2.82 (multi, 2H), 4.21 (t, 2H, J=7.0 Hz), 4.27 (quart, 2H, ImCH$_2$CH$_3$, $J_{HH}$=5.0 Hz), 7.56 (s, 1H), 7.61 (s, 1H), 9.97 (s, 1H, NCHN); $^{13}C\{^1H\}$ NMR (75 MHz, $d_3$-MeCN) δ=2.12, 15.69, 36.13, 42.89, 45.63, 48.21, 122.97, 123.22, 137.56.

In a third step, a ca. 49.9 mL of 1.25 M HCl (62.38 mmol) in EtOH was slowly added over 15 min to a 250 mL flask containing 18.0459 g (54.19 mmol) of intermediate 4(a) dissolved in ca. 175 mL EtOH. The solution was stirred for 8 h after which all of the volatile components were removed under reduced pressure and gentle heating to ca. 45° C. to give a pale yellow solid. The solid was washed with 40 mL of MeCN (×3) and 40 mL of diethyl ether (×2) and dried under vacuum to yield 11.860 g (52.45 mmol, 96.8%) of intermediate 4(b) as a colorless powder. Intermediate 4(b) has the following NMR features: NMR (300 MHz, $d_6$-DMSO) δ=1.43 (t, 3H, $CH_2CH_3$, J=7.0 Hz), 2.18 (pent, 2H, $CH_2CH_2CH_2$, J=7.0 Hz), 2.77 (s broad, 2H), 4.21 (quart, 2H, J=7.0 Hz), 4.38 (t, 2H, $J_{HH}$=7.0 Hz), 7.87 (s, 1H), 7.92 (s, 1H), 8.56 (s broad, 3H,—$NH_3$), 9.51 (s, 1H, NCHN); $^{13}C\{^1H\}$ NMR (75 MHz, $d_6$-DMSO) δ=14.95, 27.43, 35.31, 44.26, 45.87, 122.23, 122.38, 136.09.

In a fourth step, 1.789 g (47.28 mmol) of $NaBH_4$ was added in 4 portions over 20 min to a 100 mL flask containing 10.086 g (44.6 mmol) of intermediate 4(b) dissolved in ca, 90 mL of DMSO. Upon each addition, large amounts of gas evolved and a white precipitate emerged. The solution was stirred for 12 h and the precipitate was filtered-off to give a clear, pale yellow solution. The DMSO was distilled at ca. 60° C. to give an off-white solid. The product was washed with ca. 30 mL (×2) of MeCN and 30 mL (×2) of diethyl ether and dried under vacuum to yield 9.2312 g (45.36 mmol, 101.7%) of intermediate 4(c) as a colorless solid. Intermediate 4(c) has the following NMR features: $^1H$ NMR (300 MHz, $d_6$-DMSO) δ=1.30 (s broad, 3H, $BH_3$), 1.41 (t, 3H, $CH_2CH_3$, J=7.0 Hz), 2.07 (t, 2H, 7.0 Hz), 2.39 (pent broad, 2H,$CH_2NH_2$), 4.23 (quart, 2H, Im$CH_2CH_3$, $J_{HH}$=7.0 Hz), 4.30 (t, 2H, J=7.0 Hz), 4.58 (s broad, 2H,—$NH_2$),7.89 (s, 1H), 7.92 (s, 1H), 9.60 (s, 1H, NCHN); $^{13}C\{^1H\}$ NMR (75 MHz, $d_6$-DMSO) δ=15.05, 28.33, 40.43, 44.00, 44.18, 46.37, 122.22, 122.35, 135.97; $^{11}B$ NMR (96.2 MHz, 373.2 K, $d_6$-DMSO) δ=−19.53 (quart, $^1J_{BH}$=100.05 Hz).

In a final step, [EtImPrNH$_2$BH$_3$][NTf$_2$] was produced by dissolving 0.954 g (2.70 mmol) of TMSNTf$_2$ in ca. 20 mL of MeCN and then added dropwise to a slurry consisting of 0.549 g (2.70 mmol) of intermediate 4(c) in ca. 20 mL of MeCN, cooled to ca. 0° C. Upon complete addition, most of the precipitate dissolved. The reaction was stirred for 3 h and then allowed to warm to ambient temperature where it was stirred for 2 h. Subsequent filtration gave a clear, colorless solution. All of the volatile components were removed under reduced pressure and gentle heating to ca. 34° C. to give 0.960 g (2.14 mmol, 79.4%) of [EtImPrNH$_2$BH$_3$][NTf$_2$] as a pale yellow liquid. [EtImPrNH$_2$BH$_3$][NTf$_2$] had the following NMR features: $^1H$ NMR (300 MHz, $d_6$-DMSO) δ=1.21 (s broad, 3H, $BH_3$), 1.42 (t, 3H, $CH_2CH_3$, J=7.0 Hz), 2.01 (pent broad, 2H,$CH_2NH_2$), 2.42 (pent broad, 2H), 4.20 (quart, 2H, $CH_2CH_3$, J=7.0 Hz), 4.20 (t, 2H, $CH_2CH_2CH_2$, J=7.0 Hz), 5.31 (s broad, 2H,—$NH_2$),7.75 (s, 1H), 7.81 (s, 1H), 9.16 (s, 1H, NCHN); $^{13}C\{^1H\}$ NMR (75 MHz, $d_6$-DMSO) δ=14.96, 28.47, 44.08, 44.28, 46.53, 119.50 (quart, $CF_3$, $^1J_{CF}$=320.3 Hz), 121.31, 122.36, 135.79; $^{11}B$ NMR (96.2 MHz, 400.15 K, $d_6$-DMSO) δ=−19.43 (quart, $^1J_{BH}$=95.24 Hz).

In an embodiment, a composition of ammonia borane ("AB") and [EtImPrNH$_2$BH$_3$][NTf$_2$] with a molar ratio of 1:1 was prepared. The composition was heated for about 12 hours to a temperature of about 130° C. The composition underwent thermal decomposition to form hydrogen and a liquid product. The embodiment stores about 4 weight percent hydrogen.

In summary, liquid compositions that include ammonia borane and suitably chosen amine-borane materials (e.g. alkylamine boranes such as, but not limited to n-alkylamine-borane materials, ionic liquids that also include amine-borane moieties, methoxypropylamine-borane, and the like) were prepared and subjected to conditions suitable for their thermal decomposition that resulted in the production of $H_2$ and a liquid reaction product. These are believed to be the first compositions that are liquids, include ammonia borane, and result in $H_2$ and a liquid product when subjected to thermal decomposition.

Although the present invention has been described with reference to specific details, it is not intended that such details should be regarded as limitations upon the scope of the invention, except as and to the extent that they are included in the accompanying claims.

REFERENCES

The following references are incorporated by reference herein.
[1] (a) Staubitz et al., Chem. Rev., 2010, vol. 110, pp. 4079-4124; (b) Baker et al, Chem. Soc. Rev., 2009, vol. 38, pp. 279-293.
[2] Staubitz et all, Chem. Rev., 2010, vol. 110, pp. 4079-4124.
[3] (a) Bluhm et al., J. Am. Chem. Soc., 2006, vol. 128, no. 24, pp. 7748-7749; (b) Himmelberger et al., Inorg. Chem., 2009, vol. 48, pp. 9883-9889; (c) Wright et al., Chem. Comm., 2011, vol. 133, pp. 17093-17099; Mal et al., Chem. Comm., 2011, vol. 11, pp. 218-225.
[5] Grant et al., J. Phyl Chem. A, 2009, vol. 113, pp. 6121-6132.
[6] (a) Dietrich et al., Inorg. Chem., 2008, vol. 47, pp. 8583-8585; (b) Staubitz et al., Angew. Chem., 2008, vol. 47, pp. 6212-6215.

What is claimed is:

1. A neat liquid composition comprising ammonia borane and a suitably chosen amine-borane material such that said ammonia borane and said amine-borane material of said liquid composition each undergo thermal decomposition to form hydrogen ($H_2$), whereby a liquid reaction product is formed.

2. The composition of claim 1, wherein the suitably chosen amine-borane material comprises an alkylamine-borane.

3. The composition of claim 1, wherein the suitably chosen amine-borane material comprises n-hexylamine-borane.

4. The composition of claim 1, wherein the suitably chosen amine-borane material is an ionic liquid.

5. The liquid reaction product of claim 1, wherein the suitable amine-borane material comprises methoxypropylamine-borane.

6. A neat process for forming hydrogen, comprising:
providing a liquid composition comprising ammonia borane and a suitably chosen amine-borane material such that said ammonia borane and said amine borane material of liquid composition each undergo thermal decomposition to form hydrogen, and
subjecting the liquid composition to conditions suitable for thermal decomposition of the ammonia borane and the amine-borane material the liquid composition to form hydrogen, whereby a liquid reaction product is formed.

7. The process of claim 6, wherein the suitably chosen amine-borane material comprises an alkylamine-borane.

8. The process of claim 6, wherein the suitably chosen amine-borane material comprises n-hexylamine-borane.

9. The process of claim 6, wherein the suitably chosen amine-borane material is an ionic liquid.

10. The process of claim 6, wherein the suitably chosen amine-borane material comprises methoxypropylamine-borane.

* * * * *